(12) United States Patent
Lerner (10) Patent No.: US 10,673,830 B2
(45) Date of Patent: *Jun. 2, 2020

(54) DEVICES FOR TRANSMITTING AND COMMUNICATING RANDOMIZED DATA UTILIZING SUB-CHANNELS

(71) Applicant: Daniel Maurice Lerner, Missouri City, TX (US)

(72) Inventor: Daniel Maurice Lerner, Missouri City, TX (US)

( * ) Notice: Subject to any disclaimer, the term of this patent is extended or adjusted under 35 U.S.C. 154(b) by 23 days.

This patent is subject to a terminal disclaimer.

(21) Appl. No.: 16/173,258

(22) Filed: Oct. 29, 2018

(65) Prior Publication Data
US 2020/0028825 A1    Jan. 23, 2020

Related U.S. Application Data

(63) Continuation of application No. 16/005,918, filed on Jun. 12, 2018, now Pat. No. 10,154,016, which is a
(Continued)

(51) Int. Cl.
*H04L 29/06* (2006.01)
*H04W 12/02* (2009.01)
(Continued)

(52) U.S. Cl.
CPC ......... *H04L 63/0478* (2013.01); *H04L 9/12* (2013.01); *H04L 9/14* (2013.01); *H04L 9/3242* (2013.01);
(Continued)

(58) Field of Classification Search
CPC .................................................. H04L 63/0478
See application file for complete search history.

(56) References Cited

U.S. PATENT DOCUMENTS 4,386,233 A * 5/1983 Smid ..................... G06F 21/602
380/280
4,578,530 A   3/1986 Zeidler
(Continued)

FOREIGN PATENT DOCUMENTS

WO   2012140144 A1   10/2012

OTHER PUBLICATIONS

Rafaeli et al.; A survey of key management for secure group communication; Published in: Journal ACM Computing Surveys (CSUR) Surveys Homepage archive; vol. 35 Issue 3, Sep. 2003; ACM Digital Library (Year:2003).
(Continued)

*Primary Examiner* — Bradley W Holder
(74) *Attorney, Agent, or Firm* — Guerry L. Grune; ePatentManager.com (57) ABSTRACT

The disclosure provides for two or more transceiver devices and a system that utilizes one or more encrypters and one or more decrypters comprising one or more communication sources that provides transmission(s) and at least one connector, wherein transmission(s) from one or more communications sources enter a first transceiver through the connector and travels to a randomized encrypted data sub-channels (REDS) encrypter and wherein the (REDS) encrypter securely sends encrypted transmission(s) to a second transceiver. The encrypted transmission(s) enter a second transceiver and are sent to a randomized decrypted data sub-channels (RDDS) decrypter wherein the transmission(s) are decrypted.

20 Claims, 4 Drawing Sheets

Related U.S. Application Data continuation-in-part of application No. 16/005,871, filed on Jun. 12, 2018, now Pat. No. 10,171,435, and a continuation-in-part of application No. 16/005,134, filed on Jun. 11, 2018, now Pat. No. 10,171,444, and a continuation-in-part of application No. 16/005,281, filed on Jun. 11, 2018, now Pat. No. 10,154,031, and a continuation-in-part of application No. 16/005,040, filed on Jun. 11, 2018, now Pat. No. 10,154,021.

(60) Provisional application No. 62/540,266, filed on Aug. 2, 2017, provisional application No. 62/540,307, filed on Aug. 2, 2017, provisional application No. 62/518,337, filed on Jun. 12, 2017, provisional application No. 62/518,371, filed on Jun. 12, 2017.

(51) Int. Cl.
  *H04W 12/04* (2009.01)
  *H04L 9/14* (2006.01)
  *H04L 9/12* (2006.01)
  *H04L 9/32* (2006.01)

(52) U.S. Cl.
  CPC .......... *H04L 63/0428* (2013.01); *H04L 63/18* (2013.01); *H04W 12/02* (2013.01); *H04W 12/04* (2013.01); *H04L 2209/34* (2013.01); *H04L 2209/80* (2013.01)

(56) References Cited

U.S. PATENT DOCUMENTS

| | | | |
|---|---|---|---|
| 5,170,431 A * | 12/1992 | Dawson | G07C 9/00309 340/5.26 |
| 5,721,778 A | 2/1998 | Kubota et al. | |
| 5,825,890 A | 10/1998 | Elgamal et al. | |
| 6,157,722 A | 12/2000 | Lerner et al. | |
| 6,466,780 B1 | 10/2002 | Geiselman et al. | |
| 6,766,161 B2 | 7/2004 | Geiselman et al. | |
| 6,959,086 B2 | 10/2005 | Ober et al. | |
| 7,181,016 B2 | 2/2007 | Cross et al. | |
| 7,278,084 B2 * | 10/2007 | Palin | H04B 1/7183 714/758 |
| 7,382,883 B2 | 6/2008 | Cross et al. | |
| 8,462,955 B2 | 6/2013 | Ureche et al. | |
| 8,825,999 B2 | 9/2014 | Mohamed | |
| 9,094,191 B2 | 7/2015 | Avanzi et al. | |
| 9,213,858 B2 | 12/2015 | Sharma et al. | |
| 9,465,953 B2 | 10/2016 | Shasrma et al. | |
| 9,521,123 B2 | 12/2016 | Jueneman et al. | |
| 9,531,916 B2 * | 12/2016 | Janus | G06F 21/6209 |
| 9,703,985 B1 | 7/2017 | Sanchez | |
| 2007/0271465 A1 * | 11/2007 | Wu | G06F 21/36 713/183 |
| 2011/0176677 A1 * | 7/2011 | Furukawa | H04L 63/0442 380/255 |
| 2012/0198538 A1 | 8/2012 | Spring et al. | |
| 2012/0204026 A1 * | 8/2012 | Shi | H04L 9/3006 713/155 |
| 2014/0205085 A1 | 7/2014 | Janus et al. | |
| 2017/0012642 A1 | 1/2017 | Declercq et al. | |
| 2018/0074975 A1 * | 3/2018 | Deutsch | H04L 9/0637 |
| 2018/0241760 A1 * | 8/2018 | Stephens | H04L 63/123 |
| 2018/0287783 A1 * | 10/2018 | Danielson | H04L 63/0428 |

OTHER PUBLICATIONS

Papadimitrtos et al.; Secure data communication in mobile ad hoc networks; Published in: IEEE Journal on Selected Areas in Communications (vol. 24 Issue:2, Feb. 2006); pp. 343-356; IEEE Xplore (Year: 2006).

Wikipedia contributors. (May 14, 2017). Multiple encryption. In Wikipedia, The Free Encyclopedia. Retrieved 09:45, Aug. 21, 2018, from https://en.wikipedia.org/w/index.php?title=Multiple_encryption&oldid=780399982 Wikipedia contributors May 14, 2017 (May 14, 2017).

* cited by examiner

DEVICES FOR TRANSMITTING AND COMMUNICATING RANDOMIZED DATA UTILIZING SUB-CHANNELS

PRIORITY STATEMENT

This application is a continuation of and takes priority under 35 USC § 120 of U.S. patent application Ser. No. 16/005,918 filed Jun. 12, 2018, which is nonprovisional conversion of and takes priority under 35 USC § 119(e) of U.S. Provisional Application No. 62/540,307 filed Aug. 2, 2017 and entitled, "Devices for Transmitting and Communicating randomized encrypted Data Utilizing Sub-Channels".

U.S. patent application Ser. No. 16/005,918 is also a Continuation-in-part of U.S. Nonprovisional application Ser. No. 16/005,871 filed Jun. 12, 2018 and entitled, "Devices that Utilize Random Tokens Which Direct Dynamic Random Access", which is a nonprovisional conversion of U.S. Provisional Application No. 62/540,266, filed Aug. 2, 2017 and entitled, "Selectable Key and Key Locator for A Hidden Dynamic Random Access Encryption System".

U.S. patent application Ser. No. 16/005,918 is also a continuation-in-part of U.S. Nonprovisional application Ser. No. 16/005,281 filed Jun. 11, 2018 and entitled, "User-Wearable Secured Devices Provided Assuring Authentication and Validation of Data Storage and Transmission", which is a nonprovisional conversion of 62/518,371 filed Jun. 12, 2017 and entitled, "User-Wearable Secured Devices Provided with Encryption Assuring Authentication and validation of Data Storage and Transmission".

U.S. patent application Ser. No. 16/005,918 is also a continuation-in-part of U.S. Nonprovisional application Ser. No. 16/005,134 filed Jun. 11, 2018 and entitled "Securitization of Temporal Digital Communications Via Authentication and Validation for Wireless User and Access Devices" which is a nonprovisional conversion of US Provisional Application entitled "Securitizing Temporal Digital Communications Via Authentication and Validation for Wireless User and Access Devices" with Ser. No. 62/519,337, filed Jun. 12, 2017.

U.S. patent application Ser. No. 16/005,918 is also a continuation-in-part of U.S. Nonprovisional application Ser. No. 16/005,040, filed Jun. 11, 2018 and entitled "Securitization of Temporal Digital Communications with Authentication and Validation of User and Access Devices", which is a nonprovisional conversion of US Provisional Application entitled "A System for Securing and Encrypting Temporal Digital Communications with Authentication and Validation of User and Access Devices" with Ser. No. 62/518,281 filed Jun. 12, 2017.

In addition, each and every aspect of such applications are hereby fully incorporated by reference.

FIELD OF INVENTION

The technical field comprises cyber security. More specifically, the present disclosure relates to randomized concealment action involving of communications, and more particularly to devices and an associated system that securitizes signals between devices to ensure that the communications are discoverable by only designated third parties. Methods and devices for protecting of these (primarily digital and normally two-way) communications using applications that may be combined with authorization and validation for receiving, storing, and retrieval of electronic, optical, and/or electro-optical communications in the form of voice, data, or optical transmissions, are also included.

The present disclosure includes devices and a system that is specifically suited for data transmission applications that require a need for discrete communications, preserving privacy of information, electronic commerce transactions, electronic mail communications and the like.

BACKGROUND

As it is known in cryptology, encryption techniques (codification) using standard and evolving algorithms or computerized computations are used so that data exposed to undesirable third parties are encrypted making it difficult (and intended to be impossible) for an unauthorized third party to see or use it. Usually, for encryption, the term 'plaintext' refers to a text which has not been coded or encrypted. In most cases the plaintext is usually directly readable, and the terms 'cipher-text' or 'encrypted text' are used to refer to text that has been coded or "encrypted".

Encryption experts also assert that, despite the name, "plaintext", the word is also synonymous with textual data and binary data, both in data file and computer file form. The term "plaintext" also refers to serial data transferred, for example, from a communication system such as a satellite, telephone or electronic mail system. Terms such as 'encryption' and 'enciphering', 'encrypted' and 'ciphered', 'encrypting device' and 'ciphering device', 'decrypting device' and 'decipher device' have an equivalent meaning within cryptology and are herein used to describe devices and methods that include encryption and decryption techniques.

It is well known that a large number of encryption schemes have been used for at least the last 100 years and deployed more frequently since the onset of World Wars I and II. Since the beginning of the cold war, the "cat and mouse" spy missions have further promulgated the need for secure encryption devices and associated systems. Known encryption systems for these devices include the "Data Encryption Standard" ("DES"), which was initially standardized by the "American National Bureau of Standards", currently "National Institute of Standards and Technology" ("NBS" or "NIST") in the United States. Another includes the "Fast data encipherment algorithm FEAL" (FEAL) developed later in Japan, and described in the IECEJ Technical Report IT 86-33. U.S. Pat. No. 5,214,703 entitled "Device for the Conversion of a Digital Block and Use of Same" describes the use of additional devices as does an encryption device described in U.S. Pat. No. 5,675,653 entitled "Method and Apparatus for Digital Encryption". In most cases, the user making use of protecting the data after encryption or enciphering of a plaintext has delegated the strength of the invulnerability of the encryption to be positioned in front of an enemy attack. This positioning is aimed to discover the contents of the cipher text or the encryption key used, trusting in the organizations, institutions, or experts endorsing their security and providing a degree of confusion and diffusion of values introduced by the encryption device used in the cipher text. The user encrypting a particular plaintext has no objective security regarding the degree of confusion and diffusion of values present in a cipher text that result from the application of the encryption device.

Randomization of an input block has been previously addressed as in the device described in U.S. Pat. No. 4,850,019 entitled "Data randomization equipment", invented by Yokosuka Akihiro Shimizu and Yokohama Shoji Miyaguchi, both of Japan, in which two plaintext encrypting devices are presented. In both cases the randomization of data which they refer to is performed according to individual 64 bits data blocks provided as input data. This is described in the patent description where it is stated that "final channel data obtained after function and transform operations are combined by combining means to produce randomized data corresponding to the input data." Properties and features of the randomization lie in the input data block, in the encryption key, and in the operations and transformations that the device carries out in the 64 bit data block provided as input data. It is also stated that for this invention, both a 64-bit encryption key for the first encrypting device, and a 128-bit encryption key for the second is utilized.

The encryption device in U.S. Pat. No. 5,214,703 entitled "Device for the conversion of a digital block and use of same", invented by James L. Massey, and Xuejia Lai, both of Switzerland, is another such device that also uses well-known diffusion and confusion techniques, but the cipher text message that results from its application presents no properties to provide objective measures, by the user. Here, the degree of confusion and diffusion of values presented in the cipher text message and, as it happened with the above-mentioned device, the confusion and diffusion introduced refers to the 64-bit data block provided as input for encryption. In the description of this patent it is clear that "it (encryption) can be proven when the quantity of four operations is a minimum for meeting the object of diffusion", and relegating to experts, organizations or institutions, their appraisal of the degree of diffusion and confusion introduced into the ciphertext resulting from its application. Such a device makes use of a 128 bit encryption key.

Another example of an encrypting device utilizing useful scrambling techniques resulting in ciphertext is provided in U.S. Pat. No. 5,675,653 entitled "Method and Apparatus for Digital Encryption", invented by Nelson Douglas Valmore, Jr. In this patent it is concluded that people with knowledge in cryptology will recognize that typical digital encryption usually uses two well-known techniques; substitution and transposition. For the devices described in this patent the invention does not yield ciphertext that is possible for a layperson to verify in an objective manner without understanding the scramble achieved in the resultant ciphertext.

The device in patent application WO 99/57845 A, entitled "Randomization-encryption system", published 11 Nov. 1999, occasionally generates randomized text as ciphertext that substantially presents random number sequence properties, so that the degree of diffusion and confusion of values in the randomized-encrypted text introduced by the encryption key used can be checked in an objective way. The randomization of the ciphertext depends on the plaintext that it is encrypted and on the selected encryption key. Such device do not allow advanced knowledge that any encryption key with any plaintext can generate a cipher text that complies with the at random number sequence properties. This also forces the user to obtain an explicit evaluation to know if the maximum degree of diffusion and confusion values is being implemented. Therefore, in the case that the cipher text does not comply with the random number sequence properties and later to the explicit evaluation, it is necessary to select a new encryption key for use and to repeat the randomization-encryption process if the user wants the randomized-encrypted text to have the maximum confusion and diffusion properties. This includes disadvantages inherent in the selection of a different encryption key for a particular plaintext (set) and the increase of different encryption keys that can be forced to work for proper decryption. Furthermore, in the case of large plaintext, the probability that the entire resultant encrypted text complies with the random number sequence properties are lower, so that the user may have to repeat this process to achieve successful encryption/decryption.

It is worth mentioning, that the existence of ciphering devices that operate according to the input data, can be either the encryption key or the plaintext message data. Some examples of these include the ciphering device of U.S. Pat. No. 4,157,454 entitled "Method and System for Machine Enciphering and Deciphering", invented by Wolfram Becker, that shows an enciphering algorithm with rotations depending on the used encryption key, as well as the ciphering device in U.S. Pat. No. 5,724,428 entitled "Block encryption algorithm with data-dependent rotations", invented by Ronald L. Rivest, This device makes use of rotations according to the input data and intermediate encryption results in order to determine the quantity of each data rotation being encrypted.

These encrypted and decrypted data and data communications require special encryption techniques essential to denying fraudulent or otherwise unauthorized third parties with the ability to access sealed encrypted transmissions for data at rest as well as for data on the move.

The use of encryption devices by the general population is becoming very common in for example, commercial electronic transactions and/or electronic mail. A predominant portion of all societies want to believe in an objective, easily verified way, that the maximum degree of the diffusion and confusion (encryption) of data and data values provided by a system they are using to encrypt their data, is the superior set of encrypted devices and system.

Forward Data Transmission with Encrypted Sub-Channels

In many cases, the use of encryption devices are enhanced with the use of forward error correction coding. Forward error correction coding expands data (data strings, data sets, etc.) and places check sums (using American Standard Code for Information Interchange (ASCII) and Extended Binary Coded Decimal Interchange Code (EBCDIC)) into "translation tables" which utilize binary numbers to represent letters or other symbols for encoding and encryption. One object of this technique is to try sharing encrypted data between at least two (2) parties using some type of open standard with either the same language or a binary standard.

Assuming that the transmission stream is performing in a proper fashion, the use of forward error encoding and the use of sub-channels can provide a false impression that useful and uncorrupted ("good") data appears as not useful and corrupted ("bad") data. There are several techniques which could provide this false impression and thereby deter or eliminate the possibility that a potential third party impersonator or thief could access the actual (original) transmission. Our system provides the ability to inject intentionally disguised (erroneous) data into the forward error correction encoded data by intentionally injecting this disguised erroneous data into the original transmission of the original data or original signals. This system requires that the injection of these errors does not exceed a threshold associated with the data transmission. The receiving end for the transmission will then correct for the errors by separating these errors from the original data transmission. In operating a system in this manner, it is possible to repair the original data/signals, and thereby obtain the original intended data/signals and recover the errors/disguised/erroneous data into a separate transmission stream. This separate transmission stream is described herein as a sub-channel.

By combining the sub-channel with the forward error corrected data, the sub-channel transmission appears as "noise" or a scrambled transmission (similar to the diffusion and confusion described in the background section above). This "noisy" data, can now itself be encrypted, which prescrambles the data/signal transmission before the transmission enters the encrypter. Essentially, the transmission data is "premixed" before entering an encrypter device.

Using this technique and encrypter device allows for effectively and significantly increasing the strength of the encryption. There is a limit regarding how much intentionally erroneous appearing data can be injected or infused into the transmission. If random numbers are provided, even if the same data is "randomized" on multiple occasions, randomness will continue to be transmitted and received. Randomizing the data equates to ensuring that there is no repeating pattern used to mask or disguise the original transmission. In this manner, a random number input to the sub-channel so that the sub-channel then supports its own logic set that spreads the data rate or data length over the sub-channel, for instance, would allow for encryption and decryption by the sub-channel provider. Instead of injection a set of random numbers, the sub-channel provider could inject other data that is completely unrelated to the original transmission. This could include, for example, temporal (time related) data, message authorization codes, user IDs, etc.

Because the sub-channel is being used to inject the encryption and encrypter, it is possible to employ logic which can parse the data/signal transmissions by stretching time or space as stated above and throttling the rate at which the original desired data and/or the intentional errors are transmitted via the sub-channel.

Receiving Transmission with Sub-Channels

For the present disclosure, receiving the encrypted transmission of the sub-channels requires accepting the cypher text and decrypting this cypher text with the identical (symmetric) keys or public/private (asymmetric) key pairs. There are several techniques which allow for this type of encryption and decryption including those described in more detail as follows.

Because this transmission and associated data/signals have been scrambled, it may obfuscate currently used attack methods which utilize the public/private key pairs. Currently, asymmetric key pairs are being decrypted primarily using brute force techniques. These brute force methods are not normally very quick or wildly successful. However, these techniques are employed and can eventually accomplish their task. Brute force methods often use factoring or side channel attacks to search for repeating patterns in identical data. Because the present disclosure provides for destroying patterns in identical data, factoring and side channel attacks cannot function in the same manner and may prove to be completely ineffective and rendered worthless. By adding randomness to the sub-channels which essentially surround, further encrypt, protect, and cloak the actual encryption of the original transmission(s,) another degree of randomness is provided that will required additional decipherment, thus changing the decryption paradigm.

In order to recover the intentionally introduced forward error, at least one data correction recovery function must be applied. This recovery function corrects the (intentionally erroneous) data and outputs plain text. One other feature needed, with the proper algorithm that is included as part of the present disclosure is a separate identification of the errors and the ability to produce an output that includes only these errors as an output. This technique includes one or more splitter functions in that there is a split accomplished between real data and the recovered errors. To further clarify, the recovered errors recovered with this technique should be the entire sub-channel—which is what was originally intentionally injected/infused as corrupted or erroneous data or into the original transmission.

Once the system has been developed and the encrypter and decrypter devices arranged to transmit and receive the transmission(s), it is possible to send additional data into a decoder (which functions as another splitter) so that random numbers can be split out and together with the initial error and splitter transmission stream. This random number generator/splitter can either inject/infuse data other than has been already involved in the original transmissions or utilize other data that is completely unrelated to the original data or signals originally sent. A third set of options is that this random splitter could provide temporal (time related), message authentication codes, user IDs and other data/signals which is related to the original data/signals.

In the manner described above, it is possible to hide repeating data with "true" randomness" by introducing additional chaos to the original transmissions which now require additional layers of decryption and/or decoding to arrive back to the original transmission(s). The system described here and in more detail according to the figures below, significantly strengthens the encryption by actually pre-scrambling the data using the sub-channel(s) and adding additional sub-channels on an as needed basis. The ability to add additional subchannels allows for adding additional randomness and further insulating the transmission so that third party attacks become increasing useless. In fact, if third party attacks are discovered, this system allows for increasing encryption "on the fly"—so that as decryption by an unauthorized third party occurs, further encryption can be "dialed up" or "ratcheted".

While it is true that the devices and associated system described will expand the data size by approximately 30% (or more if additional levels of error correction are invoked), the technology for increasing computer micro-processing speeds and memory size is quickly making data size and speed of transmission of the data/signals a non-issue. The system described provides no pattern to the data or the pre-scramble locations. Specifically, without the system of the present disclosure, one can send the same data over and over again through the same cipher key and expect to receive the same cipher text as an output. Without the present system, this technique would provide clues about the original plain text and potentially knowledge regarding the cipher key. By using the techniques described herein and applying randomness to each transmission, the cipher text looks completely different for each transmission because the random number combined with repeating data values has changed the randomized data value before it is encrypted. Therefore the cipher text will be completely different for each transmission. Even though the same data is being repeatedly transmitted, the cipher text is randomly different. This leaves no avenue to infer the value of the original plain text or the cipher key. It is also possible that the entire system described herein can by itself be used as a sub-channel (by cascading the system in multiple configurations) for other transmission(s). If so employed, this might be at the expense of reducing "true or increased" randomness of the initially and intentionally introduced interference/noise/corrupted data.

SUMMARY

Most specifically the present disclosure can be described as one or more devices that encrypt transmission(s) transmitted to and/or decrypt transmission(s) received from the devices comprising;

a forward error correction encoder that encodes transmission(s) and provides a known degree of forward error correction to the transmission(s);

a sub-channel encoder;

a transmission(s) combiner that combines transmission(s) from the forward error correction encoder with transmission(s) from the sub-channel encoder;

a transmission(s) encrypter that receives combined transmission(s) from the transmission(s) combiner, wherein the transmission(s) encrypter receives one or more encrypter keys (KE) and the combined transmission(s), such that the combined transmission(s) are encrypted by the transmission(s) encrypter and sent to a transmission(s) transmitter and wherein the transmission(s) are in a form of cipher text;

a transmission(s) receiver that receives the cypher text and sends the cypher text to a transmission(s) decrypter, such that the cypher text is decrypted.

Additional embodiments include encrypted transmission(s) that communicate randomized encrypted data via sub-channels (REDS).

Decrypted cypher text from the transmission(s) decrypter also possesses one or more decrypter keys (KD) for complete decryption of the encrypted transmission(s).

It is also important that the encrypted data is sent to a forward error correction decoder and provides two transmission(s) outputs; a first output that is transmission(s) from the forward error correction decoder that is sent to a transmission(s) receiver and a second output that sends decrypted transmission(s) to a sub-channel transmission(s) decoder.

Here the transmissions receiver have received transmission(s) is received that is split into both a transmission(s) source from transmission(s) as well as sub-channel transmission(s) that includes a sub-channel data splitter.

For the sub-channel transmission(s) decoder, it decodes sub-channel transmission(s), sending one or more received random numbers from a random number generator to a random number receiver and the sub-channel transmission(s) to the sub-channel data splitter.

In a further embodiment, the sub-channel transmission(s) are split and sent to two or more transmission(s) receivers which correspond to temporal information, message authentication codes, and user data, including user ID data.

In yet an additional embodiment, transmission(s) between the devices include transmission(s) from the transmission(s) source together with sub-channel transmission(s) have become completely de-randomized, decrypted, and recovered.

Here the transmission(s) are plaintext data sent to at least one forward error correction encoder that encodes transmission(s) and provides a known degree of forward error correction to the transmission(s).

Further, the transmission(s) function to enlarge transmitted data by adding error checking features that include rows, columns, and diagonal checksums within data tables.

The forward error correction encoder then can provide corrected transmission(s) sent to a transmission(s) combiner.

The sub-channel encoder can employ a random number generator that provides one or more random numbers for the sub-channel transmission(s) encoder.

The sub-channel combiner wherein said combiner comprises transmission(s) inputs from temporal information, message authentication codes, and user data including user ID data that is sent to said sub-channel data encoder.

In many instances the sub-channel encoder receives required and/or desired input transmission(s) from sub-channels and the sub-channel encoder encodes sub-channel data and sends it to the transmission(s) combiner.

In a further embodiment, the transmission(s) combiner combines the forward error corrected transmission(s) with sub-channel transmission(s), wherein combined transmission(s) is sent to the transmission(s) encrypter.

In addition the encrypter possesses a data encrypter key, (KE) and combined transmission(s) that are encrypted and sends encrypted transmission(s) to a transmitter.

In several embodiments, the data encrypter key (KE) is a symmetric, shared, or one portion of an asymmetric key pair.

In a further embodiment, the transmission(s) are channeled through the devices so that transmissions from a transmission(s) source is combined with sub-channel transmission(s) that includes randomness so that a more complete randomized and encrypted data output is realized.

In the case of all transmissions, the following is also known to be possible; the transmission(s) devices can be data and data devices; the transmission(s) devices can be signals and signal devices; and/or the transmission(s) devices can be a combination of signals and transmissions;

In each instance it is possible that the transmission(s) be provided with and contain noise and/or some form of illogical randomness.

It is also true that the forward error correction encoder can be a forward error correction data encoder and that the transmission(s) combiner is data combiner.

In other embodiments, the decrypter keys (KD are data decrypter keys and are symmetric, shared, or one portion of an asymmetric key pair.

In yet an additional embodiment, the present disclosure includes two or more transceiver devices that utilize one or more encrypters and one or more decrypters comprising;

one or more communication sources that provides transmission(s);

and at least one connector, wherein transmission(s) from the one or more communications sources enter a first transceiver through the connector and travels to a randomized encrypted data sub-channels (REDS) encrypter and wherein the (REDS) encrypter securely sends encrypted transmission(s) to a second transceiver.

Here the encrypted transmission(s) enter the second transceiver and are sent to a randomized decrypted data sub-channels (RDDS) decrypter wherein the transmission(s) are decrypted.

In addition, the transmission(s) utilize one or more REDS encrypters in the second transceiver as well as one or more RDDS decrypters in said first transceiver and conversely one or more RDDS decrypters in said second transceiver as well as one or more REDS encrypters in said first transceiver.

Both the REDS and the RDDS can operate within an unsecured network.

In addition, the decrypted cypher text from the transmission(s) decrypter (RDDS) also possesses one or more decrypter keys (KD) for complete decryption of the encrypted transmission(s).

In all cases presented herein, the encryption and decryption is performed with standard encryption and decryption computerized computations that may or may not involve algorithms.

In addition, the transmission(s) can all be transmitted in packets.

For the devices of the present disclosure, the packets themselves may possess at least one header portion and/or one footer portion and the header or footer portion(s) are provided with a selected randomized section with sub-channels.

For all the devices described, the transmission(s) can be data contained within a data packet and/or a signal packet that is transferred between these devices.

The present invention also includes a system with one or more devices that encrypt transmission(s) transmitted to and/or decrypt transmission(s) received from the devices comprising;

a forward error correction encoder that encodes transmission(s) and provides a known degree of forward error correction to the transmission(s);

a sub-channel encoder;

a transmission(s) combiner that combines transmission(s) from the forward error correction encoder with transmission(s) from the sub-channel encoder;

a transmission(s) encrypter that receives combined transmission(s) from the transmission(s) combiner, wherein the transmission(s) encrypter receives one or more encrypter keys (KE) and the combined transmission(s), such that the combined transmission(s) are encrypted by the transmission(s) encrypter and sent to a transmission(s) transmitter and wherein the transmission(s) are in a form of cipher text;

a transmission(s) receiver that receives the cypher text and sends the cypher text to a transmission(s) decrypter, such that the cypher text is decrypted.

DETAILED DESCRIPTION

So that the above recited features and advantages of the present disclosure can be understood in detail, a more particular description of the invention and reference to embodiments are provided and illustrated in the appended figures. It is to be noted, however, that the appended drawings illustrate only typical embodiments of the present disclosure and are therefore not to be considered limiting the scope or other equally effective embodiments.

Figure 1:
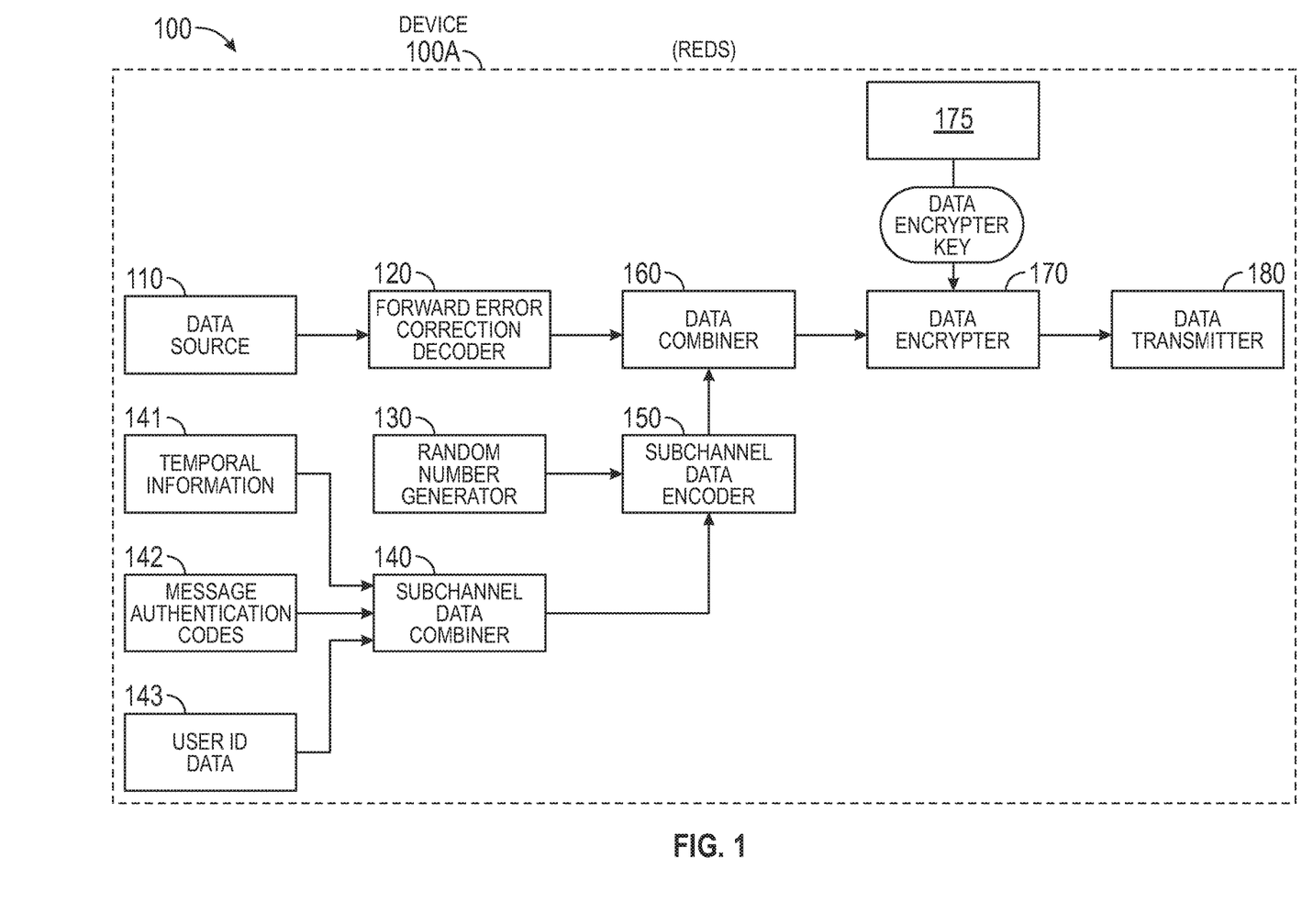
FIG. 1 is a flowchart for a device that communicates randomized encrypted data with subchannels (REDS) that transmits randomized encrypted data with data sub-channels.

FIG. 1 is a flowchart (100) describing a device (100A) that communicates randomized encrypted data with sub-channels (REDS) that transmits randomized encrypted data with data sub-channels. Beginning with a data source (110) which could be plaintext, the data is sent to forward error correction encoder (120) which encodes the data and provides a known degree of forward error correction to the data. This function enlarges the transmitted data by adding various error checking features that may include rows, columns, and diagonal checksums. The forward error corrected data is sent to the data combiner (160). A random number generator (130) provides a random number for a sub-channel data encoder (150). Sub-channel data combiner (140) which is comprised of inputs from temporal information (141), message authentication codes (142) and user data—such as user ID data (143), is sent to the sub-channel data encoder (150). At this point the sub-channel data encoder (150) has received the required or desired input for the data sub-channels. The sub-channel data encoder (150) now encodes the sub-channel data and sends it to the data combiner (160). The data combiner (160) combines the forward error corrected data with the sub-channel data. This combined data is sent to the data encrypter (170). The data encrypter (170) receives the data encrypter key, KE with the combined data from (160) encrypts the data and sends it to the data transmitter (180). Data encrypter key generator (175) produces data encryption key KE that could be a symmetric, shared or one portion of an asymmetric key pair.

At this point data source (110) has been combined with sub-channel data (150) which includes randomness so that a fully randomized and encrypted data output has been realized and transmitted through transmitter (180).

Figure 2:
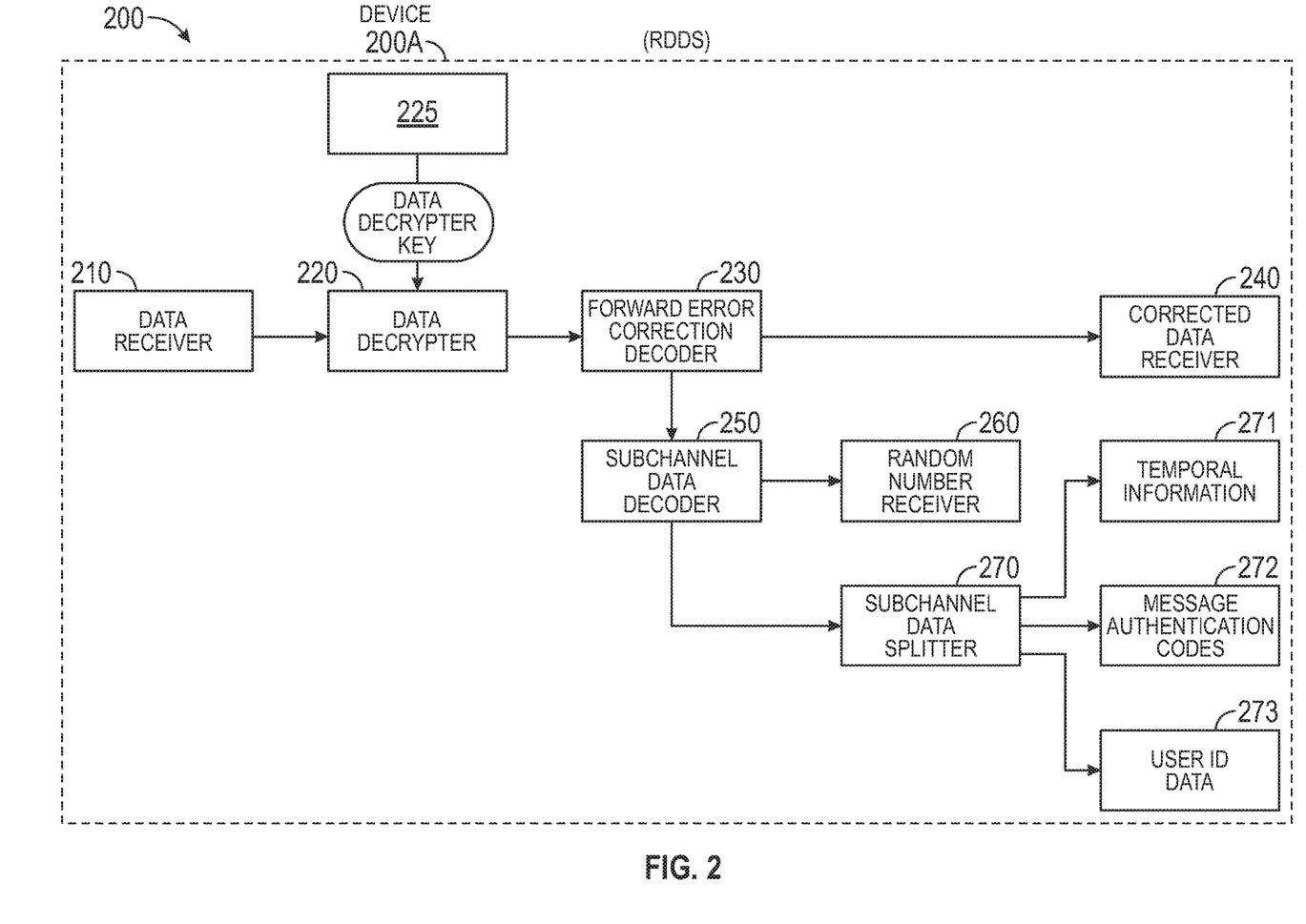
FIG. 2 is a flowchart describing a device that communicates randomized decrypted data with subchannels (RDDS) that receives randomized encrypted data with data sub-channels.

FIG. 2 is a flowchart (200) describing a device (200A) that communicates randomized decrypted data with sub-channels (RDDS) that receives randomized encrypted data with data sub-channels. Beginning with data receiver (210) which could be cyphertext data sent to the data decrypter (220). Data decrypter (220) receives the combined data (210) which must be decrypted with the decrypter key (KD) in order to decrypt the data. Data decrypter key generator (225) produces KD and could be a symmetric, shared, or one portion of an asymmetric key pair.

Data decrypter (220), which has now decrypted the data, sends the decrypted data to the forward error correction decoder (230). The forward error correction decoder (230) provides two data outputs. The first output is the forward error corrected data which is sent to the corrected data receiver (240). As before, the data could be in plain text form. The second output from the forward error correction decoder (230) sends the decrypted data to a sub-channel data decoder (250). The sub-channel data decoder (250) decodes the sub-channel data, sending the received random number to the random number receiver (260) and the sub-channel data to the sub-channel data splitter (270). Sub-channel data splitter (270) splits the sub-channel data into sub-channel data receivers (271, 272, and 273) which correspond to temporal information (271), message authentication codes (272) and user data—such as user ID data (273).

At this point, the data received from the data receiver (210) has been split into both the corrected data receiver (240) as well as the sub-channel data receivers (271, 272, and 273) and the random number receiver (260). After the operation described in FIG. 2 has evolved, the initial point source data (110), the random number generator (130), and the sub-channel data (141, 142, 143) has now been fully de-randomized, decrypted, and recovered into the corrected data receiver (240) as well as both the random number receiver (260) and the sub-channel data receivers (271, 272, and 273).

Figure 3:
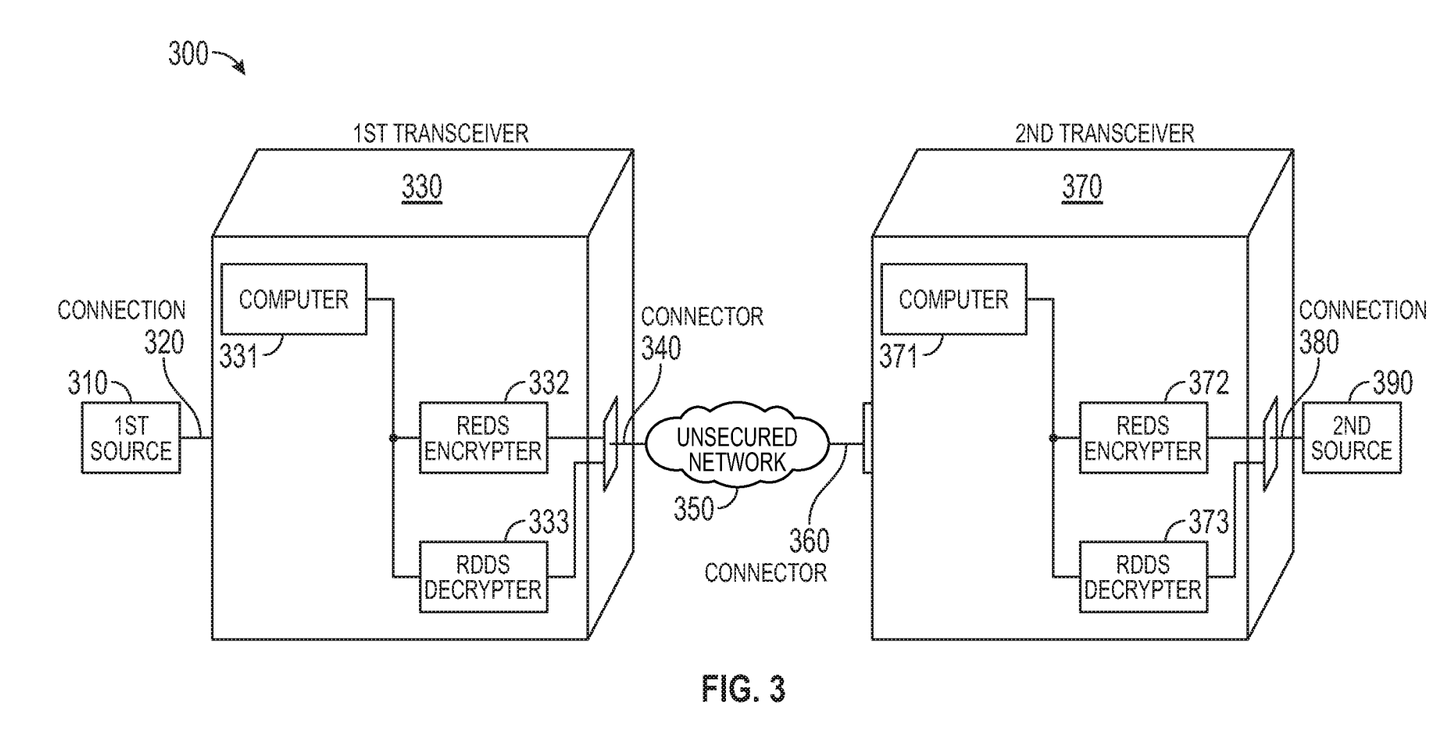
FIG. 3 is a schematic depicting the combination of two transceiver devices utilizing both encrypters and decrypters which operate according to the randomized encryption and decryption of the present disclosure.

FIG. 3 is a schematic (300) depicting the combination of two transceiver devices utilizing both encrypters and decrypters. Communication signals from a first source (310) are sent through connection (320) to the first transceiver (330). The first transceiver (330) securely connects encrypted data through connection (340) through an unsecured network (350). The second transceiver (370) securely connects encrypted data through another connection (360) through the unsecured network (350). Communication signals from a second source (390) are sent through connection (380) to the second transceiver (370).

In order to secure communication signals from the first source (310) to the second source (390), the following process is required;

The signals (310) enter the first transceiver (330) through connection (320) and travel to the REDS Encrypter (332). The (REDS) Encrypter (332) is controlled by the computer (331) to randomly encrypt and transmit the communication signals to the RDDS Decrypter (373) via an unsecured network (350). Encrypted signals arrive at the second transceiver (370) and are sent to the RDDS Decrypter (373) controlled by computer (371). RDDS Decrypter (373) decrypts the signals and sends them to the second communications source (390) through connection (380). This accomplishes sending secured signals from a first communications source (310) to a second communications source (390) by utilizing the random encryption system of the present disclosure. The communication signals can be conversely secured by sending them from the second communications source (390) to the first communications source (310) utilizing the REDS (372) in the second transceiver (370) as well as the RDDS Decrypter (333) in the first transceiver (330). This completes the process for securing data in transit.

The availability of such an encryption system allows for stronger security regarding the degree of confidentiality of the encrypted information and, therefore use of our sub-channel encryption systems with more confidence. Employing this system further establishes the goal to help encryption systems develop a larger acceptance reputation. Such acceptance provides a consequent increase in usage and a worldwide strengthening of data communications, electronic mail, and commercial electronic transactions.

Figure 4:
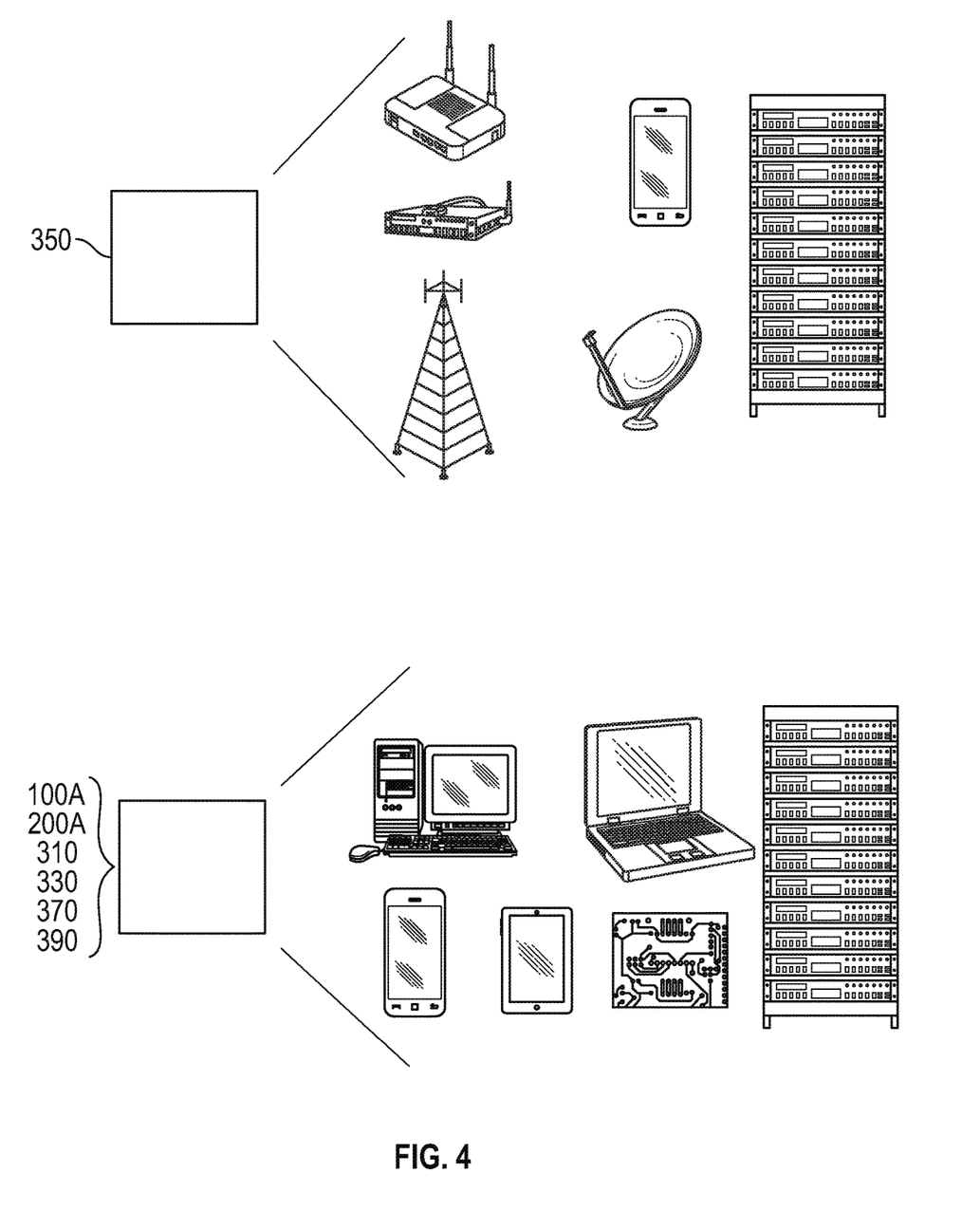
FIG. 4 is a schematic diagram that illustrates devices utilized initially represented in simple block form for FIGS. 1, 2, and 3.

FIG. 4 is a schematic diagram that illustrates devices utilized initially represented in simple block form for FIGS. 1,2 and 3. More specifically, FIG. 4 further illustrates and demonstrates actual and various devices using exploded view callouts from that depicted in the schematic diagram shown as shown and described in FIGS. 1-3. For FIG. 3, items 350 primarily represents DASA databases. In addition the list of devices associated with callouts 100A, 200A as well as 310, 330, 370, and 390 (found in FIGS. 1-3) can also represent DASA database(s) as well as user devices and/or access devices including desktop or stand-alone computer terminals replete with hard drives, laptop computers, cellular or smart telephones, computer tablets such as the iPad® and even printed circuit boards or integrated circuits (ICs). Further, elaborating on the virtual user devices as described above, these can be created and are shown as real output device(s). It remains important to understand that these real devices can be used to create virtual user devices.

Further examples of "many to many" connections are also included herein as communication data connections from 350 to the list of 100A, 200A, as well as 310, 330, 370, and 390 devices. Data communication amplifiers, repeaters, and/or range extenders which optionally assist in ensuring signal integrity and strength, over various communication distances can be located in the data communication flow paths connecting the DASA databases, user devices, and/or access devices.

While most of the foregoing discussion about the present encryption technique has focused on the use of databases, lists and tables for storing transaction specific codes, it may be preferred in some applications having limited memory to provide an algorithm for calculating the next transaction specific code. The concept of "tolerance" described earlier may be incorporated either by setting an acceptable range of values for the transaction specific code (output of the algorithm) or the designated portion itself (input to the algorithm), the latter being the equivalent of back calculating the designated portion and verifying that it is within the range of tolerance.

The computer readable media described within this application is non-transitory. In most if not all cases, the transmission of data is transmitted via signals that are non-transitory signals.

In addition, each and every aspect of all references mentioned herein are hereby fully incorporated by reference.

In compliance with the patent laws, the subject matter disclosed herein has been described in language more or less specific as to structural and methodical features. However, the scope of protection sought is to be limited only by the following claims, given their broadest possible interpretations. The claims are not to be limited by the specific features shown and described, as the description above only discloses example embodiments. While the foregoing is directed to preferred embodiments of the present invention, other and further embodiments of the invention may be devised without departing from the basic scope thereof, and the scope thereof is determined by the claims which follow.

I claim:

1. A system with one or more devices that encrypt transmission(s) transmitted to said one or more devices or decrypt transmission(s) received from said one or more devices or both encrypt transmission(s) transmitted to said one or more devices and decrypt transmission(s) received from said one or more devices comprising;

at least one computer processing unit (CPU) with computational capabilities that is connected to and controls a computer memory via an address bus and a data bus, where said address bus accesses a designated range of computer memories and range of memory bits and said data bus provides a flow of transmission(s) into and out of said CPU and said computer memory;

a forward error correction encoder that encodes transmission(s) and provides a known degree of forward error correction to encoded transmission(s);

a sub-channel encoder, wherein output of said sub-channel encoder is combined with forward error correction encoded data, to intentionally inject disguised data from said sub-channel encoder's output into original transmissions of original data or original signals, where said original transmissions of original data or original signals then appear as noise or a scrambled transmission and wherein said intentionally injected disguised data output from said sub-channel encoder is a separate transmission stream that comprises a sub-channel;

a transmission(s) combiner that combines said encoded transmission(s) from said forward error correction encoder with sub-channel transmission(s) from said sub-channel encoder;

a transmission(s) encrypter that receives combined transmission(s) from said transmission(s) combiner, wherein said transmission(s) encrypter receives one or more data encrypter key(s) (KE), where said data encrypter key (KE) is a symmetric key, shared key, or one portion of an asymmetric key pair, and receives said combined transmission(s), where said combined transmission(s) are encrypted by said transmission(s)

encrypter and sent to a transmission(s) transmitter and wherein said combined transmission(s) are transmitted in a form of cipher text;

a transmission(s) receiver that receives said cypher text and sends said cypher text to a transmission(s) decrypter, where said cypher text is decrypted, wherein encrypted transmission(s) communicate with a randomized encrypted data sub-channels (REDS) encrypter, wherein said REDS encrypter transmits randomized encrypted data with data sub-channels, and wherein said REDS encrypter possesses a data encrypter key, (KE) and combined transmission(s) that are encrypted and said REDS encrypter sends encrypted transmission(s) to a transmitter, wherein decrypted cypher text from said transmission(s) decrypter also possesses one or more data decrypter keys (KD) utilized in complete decryption of said encrypted transmission(s).

2. The system of claim 1, wherein encrypted data is sent to a forward error correction decoder and provides two transmission(s) outputs; a first output that is transmission(s) from said forward error correction decoder that is sent to a transmission(s) receiver and a second output that sends decrypted transmission(s) to a sub-channel transmission(s) decoder.

3. The system of claim 2, wherein said combined transmission(s) is received by said transmission(s) receiver and is split into both transmission(s) source from transmission(s) and sub-channel transmission(s).

4. The system of claim 3, wherein said sub-channel transmission(s) are split and sent to two or more transmission(s) receivers that correspond to temporal information, message authentication codes, and user data, said user data including user ID data.

5. The system of claim 2, wherein said sub-channel transmission(s) decoder decodes sub-channel transmission(s), sending one or more received random numbers from a random number generator to a random number receiver and said decoded sub-channel transmission(s) to a sub-channel data splitter.

6. The system of claim 1, wherein transmission(s) between said one or more devices that include transmission(s) from one or more transmission(s) sources together with said sub-channel transmission(s) have become fully de-randomized, decrypted, and recovered.

7. The system of claim 1, wherein said encoded transmission(s) are plaintext data sent to said forward error correction encoder that encodes transmission(s) and provides a known degree of forward error correction to said encoded transmission(s), and wherein said encoded transmission(s) function to enlarge transmitted data by adding error checking features that include rows, columns, and diagonal checksums within data tables.

8. The system of claim 1, wherein corrected transmission(s) is sent to a transmission(s) combiner.

9. The system of claim 1, wherein a random number generator provides one or more random numbers for said sub-channel encoder.

10. The system of claim 1, wherein said transmission(s) combiner comprises transmission(s) inputs from temporal information, message authentication codes, and user data including user ID data that is sent to said sub-channel data encoder.

11. The system of claim 1, wherein said sub-channel encoder has received required or desired or both required and desired input transmission(s) from sub-channels and wherein said sub-channel encoder encodes sub-channel data and sends it to said transmission(s) combiner, and wherein said transmission(s) combiner combines forward error corrected transmission(s) with sub-channel transmission(s), wherein combined transmission(s) is sent to said transmission(s) encrypter.

12. The system of claim 1, wherein said transmission(s) encrypter possesses a data encrypter key (KE) and combined transmission(s) that are encrypted, and sends encrypted transmission(s) to a transmitter, and wherein said data encrypter key (KE) is a symmetric key, shared key, or one portion of an asymmetric key pair.

13. The system of claim 1, wherein transmission(s) are channeled through said one or more devices, and wherein transmissions from a transmission(s) source is combined with sub-channel transmission(s) that includes randomness so that a more complete randomized and encrypted data output is realized.

14. The system of claim 1, wherein all transmission(s) and transmission(s) devices are data and data devices.

15. The system of claim 1, wherein all transmission(s) and transmission(s) devices are signals and signal devices.

16. The system of claim 1, wherein all transmission(s) and transmission(s) devices are a combination of signals and transmissions.

17. The system of claim 1, wherein transmission(s) are provided with and contain noise and/or some form of illogical randomness.

18. The system of claim 1, wherein said forward error correction encoder is a forward error correction data encoder.

19. The system of claim 1, wherein said transmission(s) combiner is a data combiner.

20. The system of claim 1, wherein said data decrypter keys are symmetric keys, shared keys, or one portion of an asymmetric key pair.

* * * * *